March 9, 1965 D. G. LOOMIS ETAL 3,172,153
APPARATUS FOR MOLDING POWDERED MATERIALS
Filed Oct. 11, 1961 5 Sheets-Sheet 1

INVENTORS.
DAVID G. LOOMIS
EDWIN J. ROGERS
BY Charles Marks
ATTORNEY

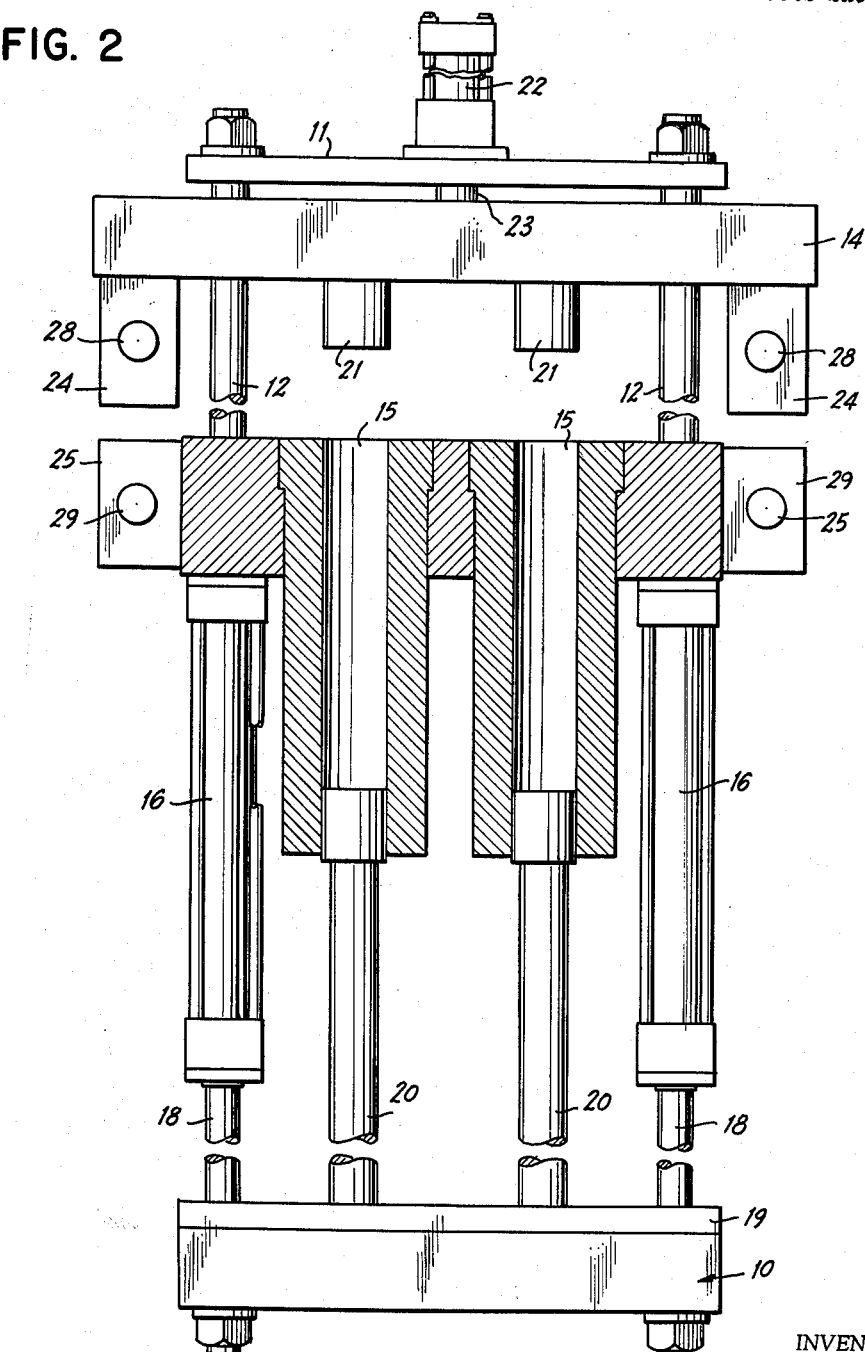

March 9, 1965  D. G. LOOMIS ETAL  3,172,153
APPARATUS FOR MOLDING POWDERED MATERIALS
Filed Oct. 11, 1961  5 Sheets-Sheet 3
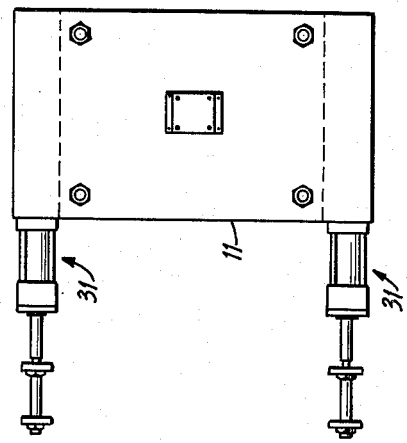
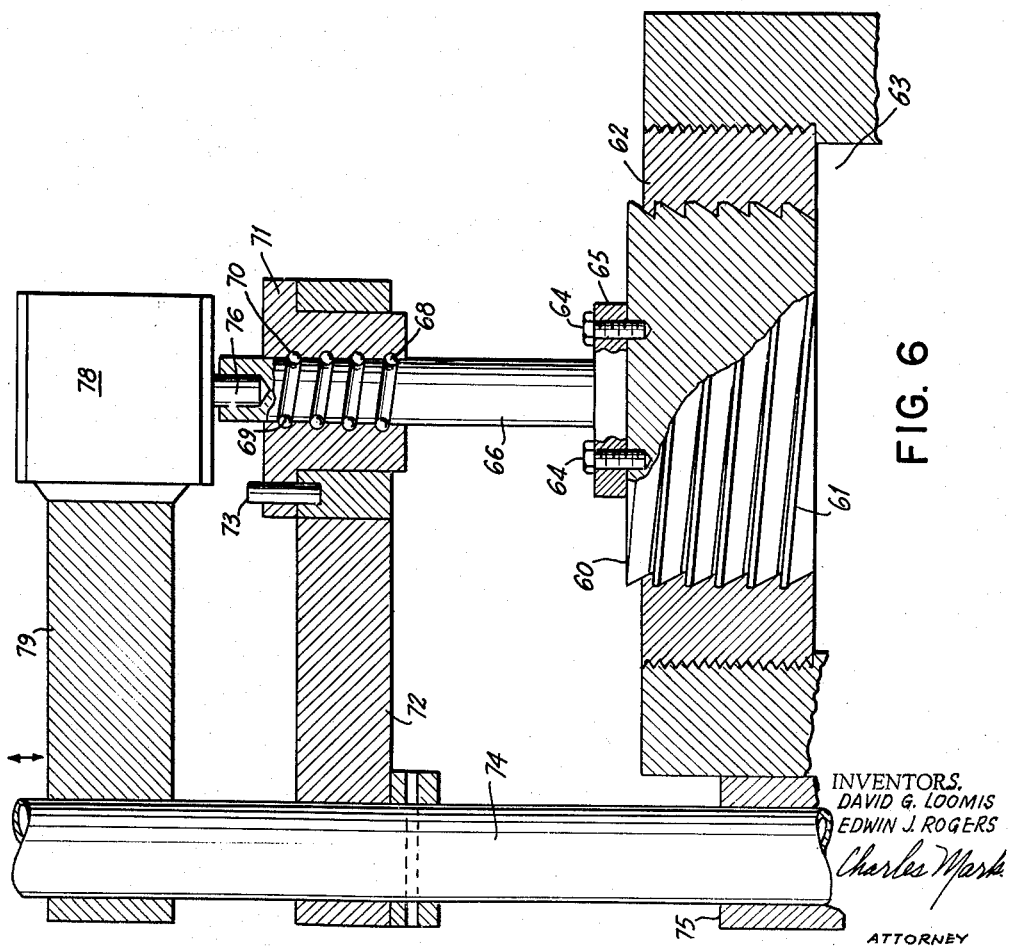
INVENTORS.
DAVID G. LOOMIS
EDWIN J. ROGERS
Charles Marks
ATTORNEY

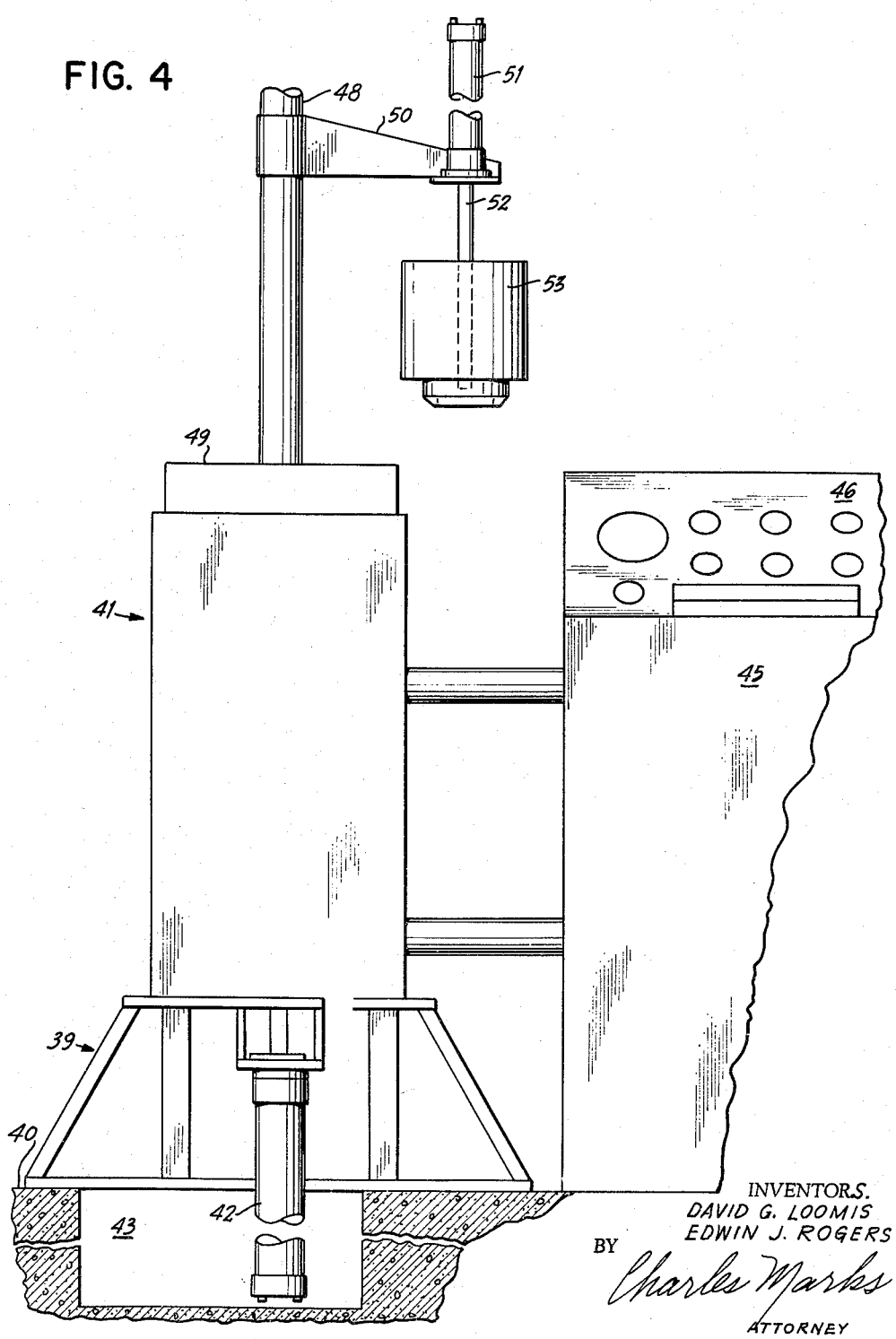

March 9, 1965

D. G. LOOMIS ETAL 3,172,153

APPARATUS FOR MOLDING POWDERED MATERIALS

Filed Oct. 11, 1961

INVENTORS.
DAVID G. LOOMIS
EDWIN J. ROGERS
BY Charles Marks
ATTORNEY

United States Patent Office 3,172,153
Patented Mar. 9, 1965

3,172,153
APPARATUS FOR MOLDING POWDERED MATERIALS
David G. Loomis, 136 Alexander Ave., Montclair, N.J., and Edwin J. Rogers, 620 Kieffer St., Wooster, Ohio
Filed Oct. 11, 1961, Ser. No. 144,509
4 Claims. (Cl. 18—5)

This invention relates to presses employed in the compacting of powdered materials, such as ceramic and metallic powders, where the hydraulic pressure of a liquid, such as oil or water, is applied directly to a flexible bag which encloses the powdered material, separates it from the liquid and serves as a mold.

Heretofore, such molding operations have frequently been characterized by extreme slowness, thereby limiting the rate of production of molded powdered parts and adding to their ultimate cost. This has been especially true where such operations have involved the molding of large parts. Moreover, the presses employed in such operations have often been very heavy, cumbersome and expensive.

Accordingly, it is an object of the present invention to provide a hydraulic press capable of producing molded powdered parts, of both large and small size, at a substantially greater rate than that available from conventional equipment.

Another object of the invention is to provide a hydraulic press of the character indicated which is easy to manipulate and which is of lightweight construction.

Another object of the invention is to provide a pressure chamber which may be employed in a press of the character indicated and which has improved means for accomplishing access thereto, closure thereof and removal of molded parts therefrom.

Another object of the invention is to provide an improved method for accomplishing the rapid manufacture of molded powdered parts of both large and small sizes.

It will be noted that one of the problems encountered in the employment of pressure chambers for the molding of powdered parts arises by reason of the extrudability of the bag members used in holding said powdered parts within the pressure chambers. Thus, flexible bags composed of rubber or other elastomeric or yieldable materials are conventionally employed to receive and hold powders to be molded within the pressure chambers of hydraulic presses. These bags serve to enclose the powdered materials, separate them from the penetration of the liquid surrounding the bags and to mold the powders when hydraulic pressures are exerted upon the external peripheries of the bags.

However, since the pressures involved are quite high, there is often a substantial tendency for the materials of which the bags are composed to be extruded into openings such as may exist between the pressure chambers and their closure members. Extrusion of this kind often results in rupture of the bag member as well as in jamming of the closure member of the pressure chamber. As a result, the rate of production is impeded and the expense of replacing the bag member is entailed.

Moreover, where the bag member is provided with a plug, as is the conventional practice, the material of which the bag is composed may also rupture by reason of concentrated elongation or excessive stretching of such material around the plug. Here again, corresponding production delays and bag replacement costs are encountered.

Consequently, a further object of the invention is to provide a means for limiting or eliminating the extrusion of such bag members.

A further object of the invention is to provide a means for preventing the extrusion of the bag members into openings such as may exist between the pressure chambers and their closure members.

A still further object of the invention is to provide an improved bag plug which avoids the imposition of concentrated elongations or stretchings on the bag members when the latter is subjected to hydraulic pressures, thereby avoiding premature bag failures.

Other objects and advantages of the present invention will become apparent from the following description as read in connection with the accompanying drawings.

In the drawings:

FIGURE 2 is a cross-sectional view taken about the line 2—2 of FIGURE 1;

FIGURE 3 is a plan view of the form of the invention depicted in FIGURE 1;

FIGURE 4 is a side elevational view of a modified form of the invention;

FIGURE 6 is a cross-sectional view of the upper portion of the pressure chamber employed in another modified form of the invention, this view also depicting the means for operating the opening and closure of said pressure chamber;

Throughout the various views similar reference numerals are employed to refer to similar parts.

Figure 1:
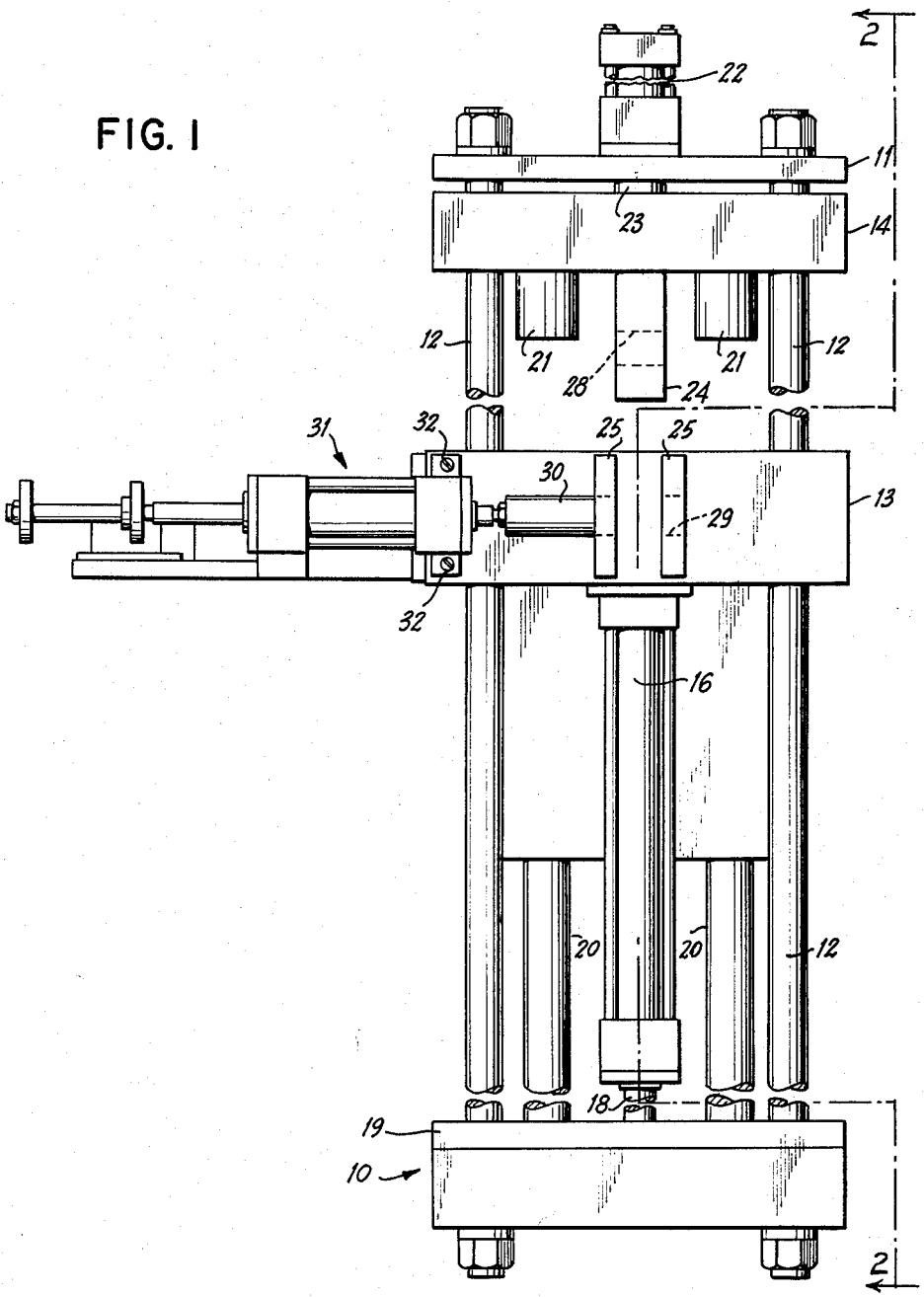
FIGURE 1 is a side elevational view of one embodiment of the present invention.

The present invention may be employed in connection with one or more pressure chambers and utilizes hydraulic pressure supplied from a suitable source thereof. Thus, as may be seen in FIGURES 1, 2 and 3 of the drawings, one embodiment of the invention comprises a press including a base, generally designated by the numeral 10, a head 11, disposed at the upper portion of the press, a plurality of guides 12 supported by a stationary platen 13, the head 11 and the base 10, and a movable platen 14 slidably engaged with said guides 12. The stationary platen 13 is disposed intermediately of the movable platen 14 and the base 10 and includes a plurality of pressure chambers 15. A plurality of ejection cylinders 16 depend from the stationary platen 14 and are provided with cylinder rods 18 engaged with a crosshead 19. This crosshead 19 supports a plurality of ejection rods 20, the upper ends of which are received within the pressure chambers in the manner hereinafter set forth in detail.

A plurality of covers 21 depend from the movable platen 14 and are receivable within the upper portions of the pressure chambers 15 when the movable platen 14 is lowered into the immediate vicinity of the stationary platen 13. Such lowering of the movable platen 14 is advantageously accomplished by the movement of a vertical hydraulic cylinder 22 which surmounts the head 11 and whose cylinder rod 23 is connected to the movable platen 14.

It is noteworthy that a pair of oppositely disposed lugs 24 also depend from the movable platen 14. A pair of locking flanges 25 is provided on each of two opposing sides of the stationary platen 13, these locking flanges 25 being aligned with the lugs 24 so that upon descent of the movable platen 14 to the vicinity of the stationary platen 13, each lug 24 will be embraced by a pair of said locking flanges 25.

The lugs 24 and locking flanges 25 are provided with circular apertures 28, 29 which are aligned when said lugs 24 are embraced by the locking flanges 25, as aforesaid. In this aligned position, latch pins 30 actuated by suitable hydraulic cylinders, such as the hydraulic latch cylinders 31 secured by suitable screws 32 to the sides of the stationary platen 13, are moved into engagement with said aligned apertures 28, 29, thereby anchoring the movable platen 14 against any upward movement.

With this arrangement, the covers 21 may be maintained in engagement with the pressure chambers 15 despite the exertion of a considerable amount of hydraulic pressure within said pressure chambers 15. It will thus be seen that by anchoring the lugs 25 as aforesaid, the invention eliminates the necessity for providing a heavy hydraulic superstructure above the movable platen 14 such as is so often employed in conventional practice for the maintenance of closure of pressure chambers.

In a modified form of the invention, the anchoring means described above is eliminated and, instead, an improved pressure-resistant cover is employed. This form of the invention is particularly applicable where very high pressures are encountered within a pressure chamber.

Thus, as may be seen in FIGURE 4 of the accompanying drawings, said modified form of the invention comprises a base, generally designated by the numeral 39 and supported upon a floor 40, a pressure chamber, generally designated by the numeral 41, an ejector cylinder 42 disposed beneath said pressure chamber 41 and accommodated within a suitable cavity 43 such as may be formed in the floor 40.

A suitable source of hydraulic fluid pressure may be housed within a container 45, the imposition of said pressure being subject to manual regulation by means of a suitable control panel 46.

Figure 5:
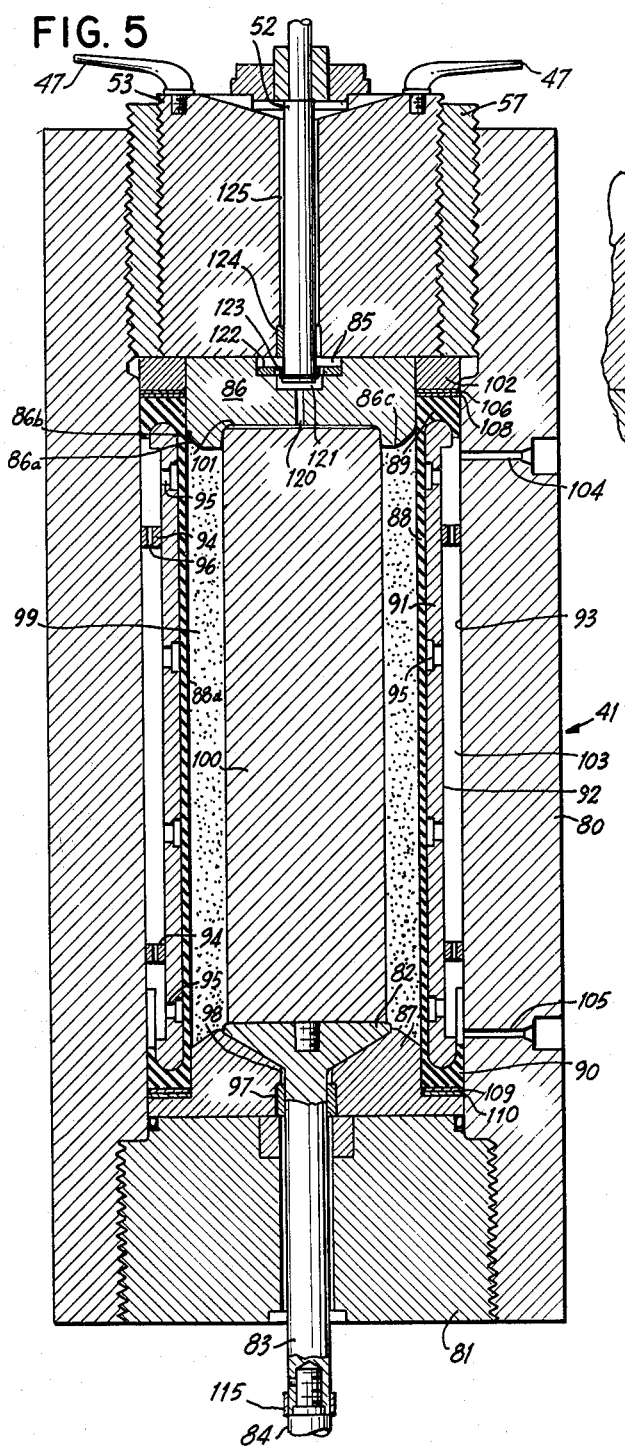
FIGURE 5 is an enlarged cross-sectional elevational view of the pressure chamber and tooling which are employed in the said modified form of the invention.

The pressure chamber 41 is provided with a vertical stanchion 48 supported upon the upper face 49 of said pressure chamber 41. This stanchion 48, in turn, supports a radially projecting arm 50 provided with a vertically disposed hydraulic cylinder 51. A vertical member, such as a lifting rod 52 depends from the hydraulic cylinder 51 and is secured to a cover 53 which is threadedly engageable with a collar or tooling retaining ring 57 secured within the mouth of the pressure chamber 41, as shown in FIGURE 5 of the drawings.

In the latter connection, it is noteworthy that the thread provided upon the cover 53 and the mating thread provided within the tooling retaining ring 57 are interrupted so as to provide what is known as a breech thread. This breech thread permits rapid opening and closure of the pressure chamber 41, since threaded engagement may be accomplished by lowering the cover 53 into the tooling retaining ring 57, while the threaded lands of the cover 53 are aligned with the grooves formed by the interruptions of the thread of the tooling retaining ring 57, and rotating said lands into engagement with the thread of the tooling retaining ring 57. Since such rotation extends through only a short arc and is substantially less than 360 degrees, it will be seen that closure of the pressure chamber 41 may be accomplished with extreme rapidity. Opening of said chamber 41 may also be accomplished with similar rapidity by reversing the steps described above.

It will also be observed that during the rotation of the cover 53 required for opening and closure of the pressure chamber 41, the friction between the threads of the cover 53 and those of the tooling retaining ring 57 may be relieved by suitable upward pressure exerted by the lifting rod 52 and hydraulic cylinder 51. Hence, such pressure relief permits easy rotation of the cover 53 during the opening and closure operations. Moreover, the mechanical power available by way of the hydraulic cylinder 51 also permits rapid and accurate vertical adjustment of the cover 53 with respect to the mouth of the pressure chamber 41.

The rotation necessary to accomplish opening and closure of the cover 53 may be accomplished manually, if desired, by manually engaging and rotating the handles 47 provided upon the cover 53, the thread friction of the cover 53 and tooling retaining ring 57 being relieved by the hydraulic cylinder 51 and lifting rod 52, as aforesaid.

In another modified form of the invention, the thread friction involved in the opening and closure of the pressure chamber may be relieved by means of a ball thread. Thus, as shown in FIGURE 6 of the accompanying drawings, a cover 60 provided with a buttress thread 61 is engageable with threaded means provided at the mouth of the pressure chamber. Thus, the cover 60 may be threadedly engaged with the internal periphery of the pressure chamber itself or with a thread provided upon an annular element such as a tooling retaining ring 62 provided at the mouth of the pressure chamber 63. The cover 60 is secured, as by screws 64, to a flange 65 provided at the lower end of a rotatable shaft 66.

This shaft 66 is supported by a ball thread 68 engaged with the internal periphery 70 of a bushing 71. The bushing 71 is housed within a radial arm 72 and is anchored against rotation by a pin 73 engaging said bushing 71 and arm 72.

The arm 72 is also fixed in a stationary position upon a vertical stanchion 74 suitably supported, as by a lug 75 secured to the pressure chamber 63.

The upper end of the shaft 66 is engaged with the splined shaft 76 of a motor 78, such as an air operated impact motor, supported by a vertically movable, radial arm 79, slidably engaged with the stanchion 74.

It will be observed that upon actuation of the motor 78, the shaft 66 will be rotated, thereby rotating the cover 60. Moreover, the shaft 66 will be vertically displaced with respect to the stationary arm 72 by reason of the movement of the ball thread whose pitch is equal to the pitch of the buttress thread. Thus, rotation of the shaft 66 can be accomplished by the motor 78 so as to produce a rapid opening and closure of the cover 60, as desired. The motor 78 and arm 79 are vertically movable in accordance with the vertical movement of the shaft 66.

It will also be noted that the weight of the cover 60 is not supported by the thread of the tooling retaining ring 62 but instead the said weight is substantially supported by the aforesaid ball thread. Thus, the ball thread permits threaded engagement between the cover 60 and tooling retaining ring 62, but avoids the friction therebetween which would otherwise arise by reason of the weight of the cover 60. Hence, this feature facilitates the rapid opening and closure of the pressure chamber 63.

FIGURE 5 of the drawings illustrates the details of the construction of a preferred form of pressure chamber which may be employed in the invention. This form of pressure chamber will be described in connection with the form of the invention depicted in FIGURE 4 although it is to be understood that similar pressure chambers may also be employed in the other above-mentioned forms of the invention.

Thus, as may be seen in FIGURE 5, the pressure chamber 41 comprises a hollow cylinder 80, whose lower end portion is threadedly engaged with a bottom nut 81 and whose mouth or upper end is threadedly engaged with the aforesaid collar or tooling retaining ring 57. The internal periphery of this tooling retaining ring 57 is, in turn, provided with a quick-opening thread in the form of the breech thread hereinabove referred to, and said quick-opening thread is engaged with the aforesaid cover 53.

As may be seen in FIGURE 5, the lifting rod 52 extends through the cover 53 and is received within a cavity 85 formed in the upper face of a plug 86. This plug 86 is engaged with a flexible bag 88 composed of rubber or other similar elastomeric substance and having a generally tubular conformation. This bag 88 functions as a mold for receiving the powdered material and for transmitting fluid pressure from the area surrounding the bag to the powdered material. The bag 88 also serves as a membrane for separating or sealing the pressurized fluid within the pressure chamber from the said powdered material. The upper and lower ends of the bag 88 are provided with sealing flanges or lips 89, 90 which are engaged with a tubular supporting member 91.

The external periphery 92 of the tubular supporting member 91 is maintained in a spaced relation with respect to the internal periphery 93 of the hollow cylinder 80 by means of a plurality of centering rings 94, said centering rings 94 and supporting member 91 being provided with suitable apertures 95, 96 to accommodate the flow of hydraulic fluid.

The bag 88 is also engaged with a second plug 87 disposed at the lower end of the bag 88. This second plug 87 permits opposing a downward thrust exerted upon the bag 88 by the fluid pressure within the chamber by providing a seat for a tapered flange 82 formed at the upper end of a vertically movable shaft 83 which extends through an aperture 98 in the second plug 87 and communicates with an ejector pin 84 actuated by the ejector cylinder 42 (see FIG. 4). The shaft 83 is guided by a bushing 97 threadedly engaged with the aperture 98 in the plug 87.

In practice, the bag 88 may be retained within the pressure chamber by the tooling retaining ring 57. When the cover 53 is removed from engagement with the tooling retaining ring 57, and the plug 86 removed from engagement with the bag 88, the latter may be filled with a suitable powdered material 99 intended for the formation of a molded powdered part. If such part is to have a hollow conformation, a suitable core pin 100 may be disposed within the bag 88 so as to surmount the tapered flange 82. If desired, the core pin 100 may also be suitably fastened to the tapered flange 82.

The bag 88 may then be sealed by the insertion of the plug 86 in the upper end of the bag 88, said plug 86 being provided with a suitable seat 101 wherein the core pin 100 may be received. The cover 53 is then threadedly engaged with the tooling retaining ring 57 in the manner described above and brought into contact with an adaptor ring 102 disposed annularly of the upper portion of the plug 86.

It will be noted at this juncture that the plug 86 does not contact the cover 53 and hence is not rotated when the cover 53 is screwed into or out of engagement with the tooling retaining ring 57. In this way, any disturbance of the upper portion of the powdered material within the bag 88, which might otherwise be entailed by reason of rotation of the plug 86, is avoided.

It will also be observed that the lower face of the plug 86 is tapered, as at 86a, and that it is rounded, as at 86b and 86c. With this conformation, the internal periphery 88a of the bag 88 may be urged into contact with the plug 86 when hydraulic pressure is exerted upon the bag 88. By reason of the conformation of the plug, however, excessive stretching or elongation of the bag 88 will be avoided, thereby eliminating the possibility of bag rupture from such causes.

It is to be understood that the description of the above-mentioned bag has been set forth for illustrative purposes only and to illustrate the bag tooling employed for the formation of molded parts of cylindrical conformation. Bag tooling of other shapes may also be employed to form a great variety of other molded articles having other than cylindrical conformations.

Hydraulic fluid may be introduced to the annular space 103 by way of radial channels 104, 105 connected to a suitable pump (not shown) and may flow through the apertures 95, 96 so as to exert a desired hydraulic pressure upon the bag 88, which transmits this pressure to the powdered material 99 contained therein.

In this way, pressures in the order of 15,000 pounds per square inch or more may be exerted upon the powdered material 99 within the bag 88. Under such pressures, the flexible material of the bag tends to extrude through any opening presented to it. As previously pointed out, such a tendency, if unremedied, presents serious difficulties in the pressing operation, which may well be rendered unfeasible by reason thereof. However, the present invention makes use of one or more backing rings which effectively prevent such extrusion of the bag 88.

Figure 7:
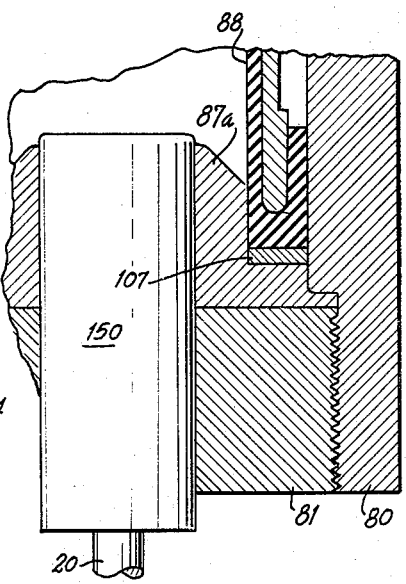
FIGURE 7 is a fragmentary cross-sectional elevational view of the lower portion of a pressure chamber which may be employed in the form of the invention depicted in FIGURES 1, 2 and 3.

Thus, as shown in FIGURE 7, an annular element such as a backing ring 107 may be disposed in contact with the sealing flange 90 of the bag 88 and may be suitably supported, as by the plug 87a. A similar backing ring may be disposed upon the opposite sealing flange of the bag 88. Such backing rings oppose the tendency of the bag material to be extruded into any spaces such as may be present between the inner periphery of the hollow cylinder 80 and adjacent members such as the plug 87a.

In another preferred arrangement of the invention, it has been found desirable to avoid extrusion of the bag material by means of a series of supporting members of progressively decreasing ductility.

Thus, as may be seen in FIGURE 5, an adaptor ring 102 and a series of two backing rings 106 and 108 are disposed upon the sealing flange 89 of the bag 88 and are supported in such position by the tooling retaining ring 57 and cover 53.

The nature of these adaptor and backing rings constitutes an important feature of the present invention. Thus, it has been discovered that if the backing ring closest to the sealing flange 89 of the bag 88 is of relatively ductile material and if the backing rings progressively decrease in ductility as their distance from the sealing flange 89 increases and as they approach a support such as that presented by the tooling retaining ring 57 and cover 53, the extrusion of the bag 88 between the backing rings and the plug 86 will be effectively inhibited. For example, it has been found that such inhibition is accomplished if the backing ring 108 is composed of a very ductile plastic material such as polytetrafluoroethylene plastic known by the trade name "Teflon" and made by E. I. du Pont de Nemours Inc., which backing ring 106 is of a less ductile plastic material such as nylon; which, in turn, is surmounted by an adaptor ring 102 composed of a still less ductile material such as steel. Another arrangement which has been found to be effective is one wherein the progressive hardness of the backing rings 108, 106 and adaptor ring 102 is determined respectively by materials such as leather, copper and steel.

Similar backing rings 109 and 110 and, if desired, a suitable adaptor ring (not shown) may also be disposed beneath the sealing flange 90.

It will also be observed that the plug 86 is provided with a vertical aperture 120 which communicates between the interior of the bag 88 and a depression 121 formed in the cavity 85. The lifting rod 52 is provided with a collar 122 having a plurality of apertures 123 which communicate between said depression 121 and the upper portion of said cavity 85. The lifting rod 52 is engaged with a spider bushing 124 provided with apertures communicating between said cavity 85 and an aperture 125 in the cover 53, said aperture 125 housing the lifting rod 52 and communicating with the external atmosphere. Thus, by way of these openings, any air which is forced out of the powdered material during the pressing operation may escape from the pressure chamber.

The hydraulic pressure may be exerted upon the bag 88 for as long as is required to accomplish the necessary compacting of the powdered material 99 contained therein. When this pressing operation has been completed, the cover 53 and plug 86 are removed and the ejection cylinder 42 (FIG. 4) actuated hydraulically so as to urge the ejector pin 84 upwardly against the shaft 83, thereby lifting the molded powdered part out of the pressure chamber. If a core pin 100 has been employed, the molded powdered part can be secured in this raised position, as by manual engagement, while the ejector pin 84 is lowered so as to withdraw the core pin 100 back into the pressure chamber.

Where a substantial downward pressure is exerted by the hydraulic fluid upon the bag member within the pressure chamber, it has been found desirable to employ the core pin 150 depicted in FIGURE 7 of the drawings. Thus, where substantially flat objects are to be molded within the pressure chamber, the upper portion of the bag member may be far below the cover of the pressure chamber so that the pressurization of the fluid within the chamber results in a downward vertical thrust upon the bag member and its contents. In such a situation, the core pin 150, which has a substantially cylindrical conformation, may be utilized, as in the form of the invention depicted in FIGURES 1, 2 and 3, to transmit the downward thrust to the crosshead 19 and thence to the base 10 which is in supporting contact with said crosshead 19. In this way, a heavy downward thrust may be readily absorbed by the light press structure.

When the pressing operation is completed, the molded powdered part may be ejected by the core pin 150 in the same manner previously described.

During the aforesaid removal operation, the bag 88 may be urged against the tubular supporting member 91 by a suitable vacuum or reduced hydraulic pressure exerted by way of the channels 104, 105 and apertures 95, 96.

When the molded powdered part has been removed from the pressure chamber, it may be conveniently disposed of as, for example, by transferring it to a suitable storage area.

It will be observed that the foregoing procedure whereby the bag 88 in the pressure chamber is filled with a suitable powder, sealed as by plug 86 surmounted by a quick-closing cover, subjected to a hydraulic pressure and then retained within the pressure chamber while a bottom ejection member lifts the compacted powdered article from the pressure chamber, after removal of said cover and plug, is an extremely rapid one well beyond the capacities of conventional equipment.

The bag 88 may be retained within the pressure chamber throughout a production run; or, if it be desired to use another bag, the bag 88 may be removed and replaced by such other bag in the following manner. Thus, the tooling retaining ring 57 may be unscrewed from its engagement with the pressure chamber and then the entire bag-supporting structure may be raised out of the pressure chamber by means of a collar 115 engaged with the shaft 83 and urgeable against the bushing 97, when the ejector pin 84 is raised, thereby raising the plug 87 and the various members surmounting said plug 87. In this exposed position of the bag supporting structure, the bag 88 may then be removed and replaced by any other suitable bag member, which may then be withdrawn into the pressure chamber upon lowering of the ejector pin 84.

It will be seen from the foregoing that the present invention achieves its objects in an inherently simple and economical manner; and that it makes possible very high production rates which have been heretofore unattainable. Moreover, the procedure and machine described above are operable by unskilled operators and the quality of the compacted powdered articles produceable thereby is uniformly high.

The embodiments of the invention illustrated and described hereinabove have been selected for the purpose of clearly setting forth the principles involved. It will be apparent, however, that the present invention is susceptible to being modified in respect to details of construction, combination and arrangement of parts which may be resorted to without departure from the spirit and scope of the invention as claimed.

We claim:

1. In a hydraulic press, an improved pressure chamber comprising, in combination: a cylinder; means for introducing and exhausting hydraulic fluid into and from said cylinder; a flexible bag located within said cylinder and subject to a pressure transmissible by said hydraulic fluid; means for supporting said flexible bag within said cylinder; at least one annular ring surmounting each end of said flexible bag to obstruct extrusion thereon when said pressure is exerted; the said flexible bag being supported by a nut engaged with the lower portion of said cylinder and by a retaining ring threadedly engaged with the upper portion of said cylinder; the said flexible bag being adapted to receive a quantity of powdered material to be compacted by the exertion of said hydraulic pressure; the said flexible bag being plugged by said nut and by an upper plug; the said retaining ring being threadedly engageable with a cover; the weight of said cover being relieved during engagement and disengagement of said cover by balancing means disposed above said cover and secured to a stanchion disposed externally of said cylinder; said upper plug being in a spaced relation with respect to said cover when the latter is engaged with said retaining ring; said upper plug and cover being provided with a channel whereby air from the interior of said flexible bag may escape to the external atmosphere; the annular ring upon the upper portion of said flexible bag being supported by said cover and said retaining ring; the annular ring upon the lower portion of said flexible bag being supported by said nut; the said nut also slidably receiving a vertically adjustable shaft actuated by pressure-exerting means beneath said cylinder; said shaft being provided with flange means; said powdered material surmounting said flange means and being raisable by said flange means from within said cylinder after the powdered material has been compacted by said hydraulic pressure and said cover has been disengaged from said retaining ring, the said flange means being seatable upon the said nut to oppose an axial thrust exerted by said hydraulic pressure, whereby said axial thrust is transmitted to said cylinder.

2. An improved press for compacting powdered materials comprising, in combination: a pressure chamber; a flexible bag disposed within said pressure chamber and adapted to receive a quantity of said powdered material; means for closing said pressure chamber after said flexible bag has received said quantity of said powdered material; means for exerting fluid pressure upon said flexible bag and said powdered material; and ejection means disposed at the bottom of said pressure chamber, whereby the said powdered material may be raised out the pressure chamber after removal of said means for closing said pressure chamber and after the exertion of said fluid pressure upon said flexible bag and said powdered material, said ejection means being seated upon the lower portion of said pressure chamber during said exertion of fluid pressure, thereby transmitting thrust arising from said fluid pressure to the wall of said pressure chamber, the said flexible bag being provided with at least one sealing flange; said sealing flange being surmounted by a plurality of annular rings characterized by progressively decreasing ductility; the most ductile of said annular rings being closest to said sealing flange; said annular rings being supported by said means for closing said pressure chamber and by means for securing said flexible bag within said pressure chamber, said means for securing said flexible bag within said pressure chamber including a perforated tube, said flexible bag being received within said perforated tube, said sealing flange being supported by one end of said perforated tube and provided with an annular lip contactable with the external marginal perimeter of said end of said perforated tube and with the internal periphery of said pressure chamber, said annular lip being exposed to the fluid pressure within said pressure chamber, said means for closing said pressure chamber including a removable plug receivable within said sealing flange and annular rings, said removable plug being in spaced relation with respect to the internal peripheries of said sealing flange and annular rings when said fluid pressure is not being exerted, said sealing flange and annular rings being expandable into contact with said plug by said fluid pressure, said annular lip having an end portion characterized by a downward outwardly extending curvature whereby said fluid pressure will compress said annular lip in a radially outward direction, said annular rings having a smaller internal diameter than that of said sealing flange, whereby upon said exertion of fluid pressure, said annular rings will contact said plug prior to the time when said sealing flange will contact said plug, said radially outward compression of said lip cooperating with said contact between the annular rings and said plug to obstruct extrusion of said sealing flange between said annular rings and said plug during the exertion of said fluid pressure.

3. An improved press for compacting powdered materials comprising in combination: a pressure chamber; a flexible bag disposed within said pressure chamber and adapted to receive a quantity of said powdered material; means for closing said pressure chamber after said flexible bag has received said quantity of said powdered material; means for exerting fluid pressure upon said flexible bag and said powdered material; said flexible bag being provided with at least one end portion surmounted by at least one ring, a plug being receivable within said ring and said end portion of said flexible bag, the external periphery of said plug being in spaced relation with respect to the internal periphery of said ring and said end portion of said flexible bag in the absence of said fluid pressure, said end portion of said flexible bag being provided with an annular lip having a radially outward surface disposed in contact with the internal surface of said pressure chamber and a radially inward surface exposed to said fluid pressure, said fluid pressure urging said annular lip against the internal surface of said pressure chamber and also urging said ring against said plug, thereby obstructing extrusion of said end portion of said flexible bag between said ring and said plug.

4. An improved press for compacting powdered materials comprising, in combination: a pressure chamber; a flexible bag disposed within said pressure chamber and adapted to receive a generally cylindrical core disposed axially of the flexible bag, and in spaced relation with respect to the internal periphery of the flexible bag; a quantity of powdered material being receivable between said generally cylindrical core and the internal periphery of said flexible bag, thereby forming a shell disposed concentrically of said generally cylindrical core; the shell having a wall thickness which is small in comparison with the diameter of the generally cylindrical core; means for closing said pressure chamber after said powdered material has been received between said generally cylindrical core and the internal periphery of said flexible bag; means for exerting fluid pressure upon said flexible bag and said powdered material; and ejection means disposed at the bottom of said pressure chamber; said ejection means including a flange contactable with said generally cylindrical core and shell; whereby said generally cylindrical core and shell may be raised out of the pressure chamber after removal of said means for closing said pressure chamber and after the exertion of said fluid pressure upon said flexible bag and said powdered material; said flange being seated upon annular means depending from the lower portion of said pressure chamber during said exertion of fluid pressure, thereby transmitting thrust arising from said fluid pressure to the wall of said pressure chamber and relieving said ejection means of such thrust.

References Cited by the Examiner
UNITED STATES PATENTS

| | | | |
|---|---|---|---|
| 1,226,470 | 5/17 | Coolidge | 18—59.5 XR |
| 1,826,945 | 10/31 | McKay et al. | 18—19 |
| 1,958,199 | 5/34 | Morin. | |
| 2,152,738 | 4/39 | Jeffery | 18—5 XR |
| 2,328,071 | 8/43 | Jaeckel | 18—5 |
| 2,447,434 | 8/48 | Schwarzkopf | 18—59.5 |
| 2,449,407 | 9/48 | Mulholland | 18—5 |
| 2,499,980 | 3/50 | Stokes et al. | 18—16.7 |
| 2,556,951 | 6/51 | Weidner | 18—16.7 |
| 2,616,731 | 11/52 | Osmun | 277—188 |
| 2,701,172 | 2/55 | Koester | 277—188 |
| 2,844,421 | 7/58 | Hayman | 277—188 |
| 2,848,968 | 8/58 | Novak | 113—44 |
| 2,923,130 | 2/60 | Wellon | 113—44 XR |
| 3,006,306 | 10/61 | Pfeiffer et al. | 113—44 |
| 3,015,855 | 1/62 | Merkel. | |
| 3,025,087 | 3/62 | Snow | 277—188 |

WILLIAM J. STEPHENSON, *Primary Examiner.*